United States Patent Office 2,841,823
Patented July 8, 1958

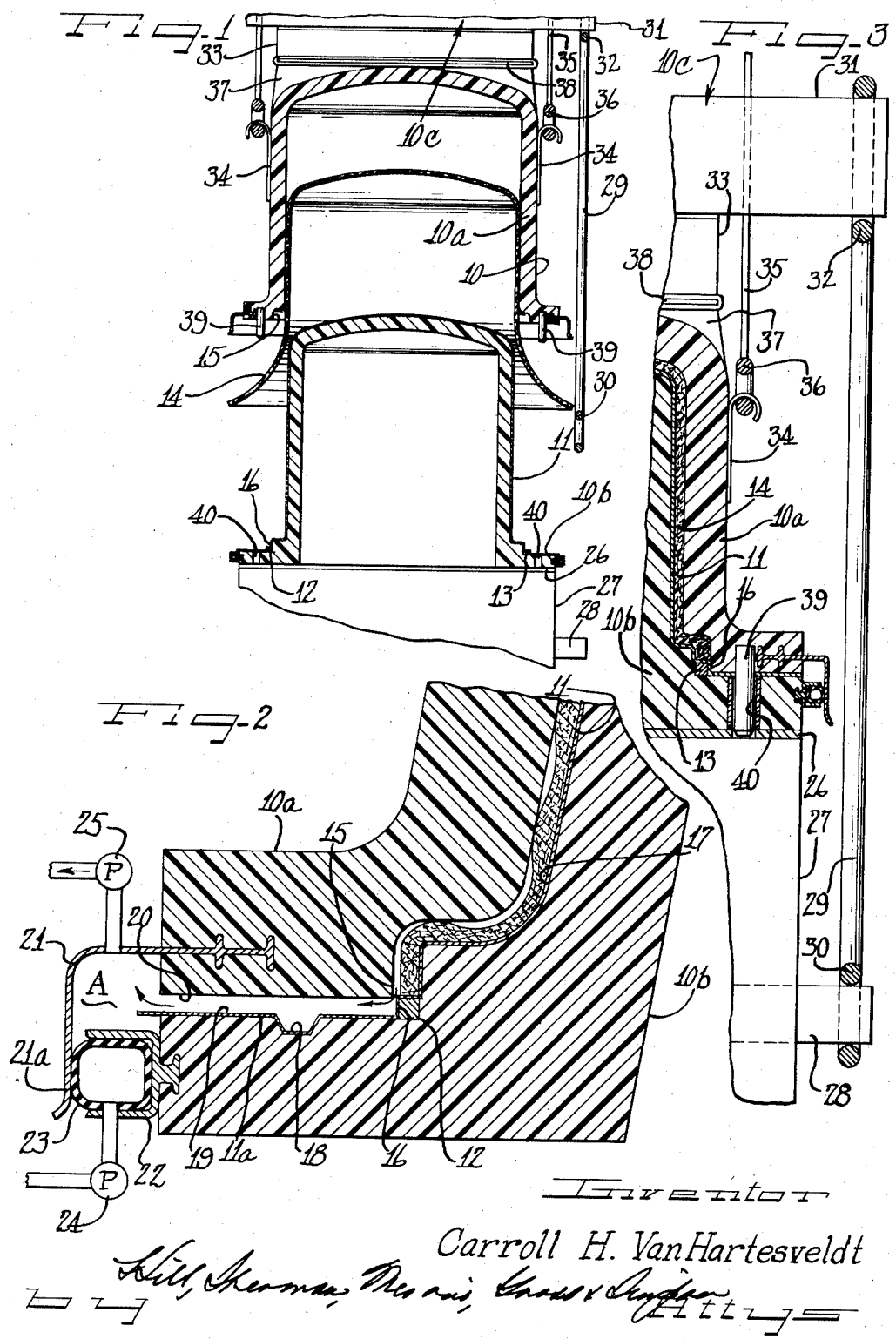
July 8, 1958 — C. H. VAN HARTESVELDT — 2,841,823
MOLDING APPARATUS
Filed Feb. 8, 1954
Inventor
Carroll H. VanHartesveldt

2,841,823

MOLDING APPARATUS

Carroll H. Van Hartesveldt, Birmingham, Mich.

Application February 8, 1954, Serial No. 408,889

1 Claim. (Cl. 18—19)

The instant invention relates to a molding apparatus, and more particularly, to an improved molding apparatus for the fabrication of glass fiber-polyester resin parts or the like.

In recent times, there has developed a very great demand for the glass fiber-polyester resin laminates, which have unusually superior structural characteristics such as high strength, impact resistance, resilience and relatively light weight. Although these laminates are employed in the form of relatively small articles, their particular structural characteristics are such that they have found extensive use in the fabrication of larger more bulky objects, such as boats, bathtubs, etc. Heretofore, the most effective production method available for the manufacture of these glass fiber-polyester resin laminates involved the use of steam or water heated matched metal dies operated in a hydraulic press. In my copending application entitled Molds and Process for Glass Fiber-Polyester Resin Parts or the Like, Serial No. 408,906, filed February 8, 1954, and made a part hereof by reference, there is described and claimed a novel mold structure employing light-weight cast plastic mold elements which may be used in the formation of these relatively large laminated articles. The previous procedure employed in the art (using matched metal dies) called for an operating pressure of about 200 pounds per square inch on the glass fiber laminate being molded. This pressure was required in order to spread the resin thoroughly through the glass fiber mat, to purge air from the mat ahead of the spreading resin and to compress whatever air is left behind into very small bubbles. This latter requirement has made necessary the use of relatively high molding pressures. On the other hand, it is desirable to employ substantially lower molding pressures using the matched metal dies as well as cast plastic dies, in order to avoid wear and tear on the dies. The instant invention provides for an improved method of molding employing a reduced pressure, and an improved molding apparatus therefor. In the instant invention, the mold members are closed upon the composition to be molded, and the cavity retaining this composition is sealed and then evacuated so as to bring the pressure therein to a minimum. This is followed by molding at a pressure sufficient to carry out the molding, but not necessarily at the extremely high pressure heretofore employed for the purpose of compressing the entrapped air into minute bubble form.

It is, therefore, an important object of the instant invention to provide an improved molding apparatus for compression molding, particularly in the case of the molding of the so-called "low pressure" laminates.

Yet another object of the instant invention is to provide an improved molding apparatus comprising a plurality of mold members cooperating to define a die cavity, means for selectively moving said members in and out of cavity forming relationship, means for applying pressure against said mold members to exert pressure against a molding composition within the cavity, and sealing means mounted on said mold members for air sealing the cavity when the mold members are in cavity forming relationship.

A further object is to provide an improved molding apparatus comprising a plurality of mold members cooperating to define a die cavity, means for selectively moving said members in and out of cavity forming relationship, and fluid pressure actuated means carried by said moving means for applying pressure against said mold members to exert pressure against a molding composition within the cavity.

Other objects, features and advantages of the present invention will become apparent to those skilled in the art from the following detailed disclosure thereof and the drawings attached hereto and made a part hereof.

On the drawings:

Figure 1 is essentially an exploded sectional elevational view showing the mold parts and elements in "open" position employed in the molding of an article such as a bathtub;

Figure 2 is an enlarged fragmentary detail sectional view of the sealing arrangement employed in the instant device, showing the mold elements in "closed" position; and Figure 3 is a fragmentary elevational view showing a second position of the elements of Figure 1.

As shown on the drawings:

In Figures 1, 2 and 3, a mold assembly, designated generally by the reference numeral 10, comprises an upper movable molding block or body 10a and a lower stationary molding block or body 10b. The upper molding block 10a is moved upwardly and downwardly by means shown partially at 10c which will be described in detail hereinafter; and such means 10c are also used to exert pressure against the laminate in the mold when the mold assembly is in closed position.

The body 10b is a rigid heat and electrical insulator preferably which may be made out of a number of suitable structural material such as wood, concrete, or the like which are recognized as being materials having such low coefficients of thermal conductivity and electrical conductivity that they are, for all practical purposes, "insulators." It will be appreciated that other types of molding dies may be used in the practice of the instant invention, including the matched metal dies of the prior art, although the invention is used most advantageously with the molding blocks 10a and 10b herein described in detail. The instant blocks 10a and 10b are preferably made of cast epoxy resin (reinforced in the case of dies of this size). Other thermosetting resins may also be used as the principal structural elements, such resins including the phenolic and the polyester resins.

The upper block 10a is made substantially entirely of the cast plastic material, but the lower block 10b comprises a body which is made of the cast plastic material and a thin heat and electrical conductor lining 11, which is preferably a metal such as 18-8 stainless steel (i. e., 18% chromium and 8% nickel stainless steel). The lining 11 is mirror-finished in order to impart a fine finish to the inside (or visible side to the user) of the bathtub which is to be molded. Contact bars 12 and 13 electrically engage opposite sides of the lining 11 along the longitudinal dimensions of the lining 11; and a voltage differential is created across the contacts 12 and 13 when it is desired to heat up the lining and thus heat the resin being molded. The details of operation of the lining 11 are brought out clearly in my copending application entitled Molds and Process for Glass Fiber-Polyester Resin Parts or the Like, Serial No. 408,906, filed February 8, 1954, which disclosure is incorporated herein by reference and need not be further discussed.

Although the instant apparatus may be used in the molding of any of the commercially available thermosetting synthetic resin molding compositions with only minor operational modifications which are well understood by those skilled in the art, the instant invention preferably employs a thermosetting polyester resin in the molding composition. Also, the filler material used in the preferred composition, which is a laminating composition, is glass fiber.

In connection with the polymerizable polyester resin, it is known generally the polyester resins may be prepared by esterification-condensation of a polybasic acid (preferably a dicarboxylic acid) and a polyhydroxy alcohol (preferably a dihydric alcohol), in the substantial absence of addition polymerization-inducing conditions. As a typical member of the thermosetting polymerizable polyester which may be cured to form a normally rigid thermoset resin, the polyester resulting from each condensation of maleic acid (or anhydride) with ethylene glycol is mentioned. This polyester is generally referred to in the art as "ethylene glycol-maleate," or in the event that a slight amount (i. e. about 10%) of propylene glycol and of phthalic anhydride have also been employed, as is customary in the preparation of laminating resins, the resin is called "ethylene glycol-propylene glycol-phthalate-maleate" and so forth. In general, this polyester is an unsaturated dihydric alcohol-dicarboxylic acid (the unsaturation being furnished by the maleyl radicals therein, which are at least about 60–75 mol percent of the acyl radicals present, the remainder being phthalyl radicals preferably). Often such laminating resins contain a small proportion of a suitably copolymerizable unsaturated monomers such as styrene and diallyl phthalate in order to assist in the cross-linking process during polymerization; but the general characteristics of these "structural" or "laminating" unsaturated polyester resins are those of the true polyester resin system. It has been found to be particularly advantageous to have incorporated in the polyester about 10–25% of a volatile monomer, such as styrene, because this effectively flushes out the fixed gases during evacuation. The resin is first obtained by the formation of long polyester chain-like molecules which are formed by condensation in the absence of addition polymerization and result in molecular chains having a plurality of unsaturated maleyl radicals therein. When such resins are cured, by addition polymerization, the maleyl radicals form cross-links between the chains thus changing the polymer from "linear" to "three-dimensional" and resulting in a rigid thermoset resin.

It has been found, however, that a flexible, substantially thermoset polyester may also be obtained. In this case the polymerizable polyester is substantially saturated instead of being substantially unsaturated, as just described. Such a resin may be an ethylene glycol-phthalate having perhaps 1–10 mol percent and preferably about 2–5 mol percent of the acid radicals as maleyl radicals and the remainder as phthalyl radicals. The "flexible" and the "structural" (or substantially rigid) polyester resins are both commercially available, and are so designated in industry.

In accordance with the procedure of the preferred method of using the apparatus, a plurality (preferably only two) glass fiber mats 14 are cut so as to fold over the coated surface of the mold form 10b and to be substantially coextensive therewith. The glass fiber mats 14 are thus formed in the shape of a large rectangle with cuts taken out of the four corners. Such glass fiber mats are commercially available in relatively thin form comprising a great plurality of glass fibers or glass fiber strands heterogeneously arranged in the form of a sheet, but sufficiently entangled with each other to form a generally cohesive or unitary sheet, which may be cut and otherwise handled as a sheet of fabric in many respects.

Such glass fiber mats may be pre-treated with polyester resin (as indicated in Figure 1), or they may be placed upon the mold form 10b and then have the necessary laminating polyester resin poured thereover so as to completely impregnate the mats 14. The amount of such laminating resin ordinarily required to accomplish this may range from about 1 to about 3 times the weight of the mats 14, and is most preferably about twice the weight of the mat. The polyester laminating resin employed for this purpose is the structural or unsaturated laminating resin hereinbefore described. As previously mentioned, the structural or unsaturated polyester resin is a resin which normally forms a rigid thermoset polyester resin upon addition polymerization thereof. It is known that such polyester when hardened is very rigid and perhaps even slightly brittle, if no filler is present therein. The impregnation of finely ground filler particles, or pigment-size particles, does not subtract substantially from the generally rigid nature of such polyester. It has also been found, however, that if certain fillers, namely, an elongated thin rod-like filler material such as glass fibers of substantial lengths, for example, at least an inch or two and preferably of substantially the entire length of the glass fiber mats, is present in a thermoset normally rigid polyester, a certain limited amount of true resiliency is imparted to the body.

In the operation of the instant invention, the mat 14 is shown over the lining 11 and liquid resin is poured over the top. The upper mold element 10a is then lowered to rest upon the polyester resin covered mat 14. This puts the mold assembly 10 above the "full pressure" position but in substantially "closed" position; with the principal pressure applied to the mat 14 being that of the weight of the upper mold block 10a; and the molding composition (resin covered mat) is confined in substantially the space equal to its volume. Of course, an appreciable amount of air (or the "fixed" or non-condensible gases) will be left in the molding composition or mat 14. At this point, the cutting edge 15 is above the cutting edge 16. As will hereinafter be described, the cavity is then sealed and evacuation is initiated. During evacuation, growing atmospheric pressure forces upper mold block 10a toward the position shown in Figure 2, at which time evacuation is virtually complete.

It should be noted that in Figure 2 there is just a small opening between the cut-off edges 15 and 16 in the upper mold block 10a and lining 11, respectively, so that the final residue of fixed gases might escape from the cavity proper (indicated generally by the reference numeral 17 in Figure 2). The contiguous faces 19 (on the liner portion 11a) and 20 (on the upper mold block 10a) are also not quite brought to their nearest proximity at this point (although the face 19 may be brought into contact with blocks of the proper thickness positioned on face 20) when pressure is finally applied to the full extent. This permits the final flow of gases from the cavity proper 17 to outside of the mold assembly, as indicated by the arrows; but restricts the flow of liquid resin. The metal lining 11 extends outwardly from beyond the contact bar 12 in a portion indicated by the reference numeral 11a which has a groove therein at 18 to permit the collection of excess resin out of the mold assembly 10 when pressure is finally applied.

An L-shaped baffle suitably anchored in the plastic body of the upper molding block 10a extends outwardly and downwardly from the periphery of the block 10a adjacent the contiguous faces 19 and 20; and this baffle 21 forms a part of the sealing means here employed. The lower block 10b has a U-shaped channel suitably anchored in the peripheral edge of the block 10b; and this channel 22 opens outwardly carrying within its mouth or open side an expandable device in the form of a flexible hose which is in communication with the source of fluid under pressure, such as the compressed air pump indicated at 24. The hose 23 is made of rubber or some other suitably resilient material which is capable of expanding when loaded with fluid under pressure and which resiliently retracts when the pressure is relieved. As here shown, the pressure is applied to the hose 23 causing it to expand outwardly and sealingly engage the depending portion 21a of the bracket or baffle 21.

It will be appreciated that the baffle 21 extends completely around the outer edge of the upper block 10a and the channel 22 carrying the flexible hose 23 extends completely around the outer edge of the lower block member 10b, so that a complete seal may be formed for the cavity 17.

As soon as the upper block 10a has been lowered to the "closed" position, the fluid pressure may be applied to the hose 23 (using in the embodiment here described fluid pressures of 50 to 100 pounds per square inch) so as to effectively form a seal with the baffle 21. Then, the cavity 17 and the chamber A which extends from the baffle 21 inwardly to the cut-off edges 15 and 16 is also evacuated by means of the vacuum pump 25 which communicates with the cavity 17 via the chamber A. The vacuum drawn is sufficient to obtain evaporation of a portion of the volatile component in the molding compound (styrene) at the temperature attained by the molding compound at this stage. To provide for this loss, an excess of volatile component or monomer is provided in the molding compound used and the partial pressure of air in the cavity should be reduced at least to about $\frac{1}{10}$ of an atmosphere and preferably at least about $\frac{1}{2}$ pound per square inch absolute. The flexible hose 23 exerts a sufficient amount of pressure against the baffle 21 to prevent appreciable air leakage therebetween and the resilient flexible nature of the hose 23, plus a rather loose fit in the U-shaped channel 22 will permit the hose 23 to effectively retain the vacuum during subsequent downward movement of the baffle 21 with the upper block 10a, when additional pressure is ultimately applied. A suitable lubricant applied between the hose 23 and baffle 21 will enhance the seal and decrease wear.

After the vacuum has been drawn in the cavity 17 and the chamber A, then additional pressure may be applied with the required amount of heat to effect curing of the thermosetting composition. Preferably, the additional pressure applied is about from $\frac{1}{2}$ to 5 atmospheres, and most preferably only about 1 atmosphere. This will make the total pressure about 2 atmospheres. The advantages of the instant invention will be appreciated when it is noted that using air at atmospheric pressure, as was the case in the prior art with respect to entrapped air in the mold, a molding pressure of 200 pounds per square inch, or about 13 atmospheres, effects a reduction in the entrapped air bubbles at a ratio of about 13 to 1. In contrast, using the instant method and apparatus the entrapped air retained in the cavity 17 at the time of molding is under a partial pressure of only $\frac{1}{2}$ pound per square inch absolute and the application of 1 atmosphere of gauge pressure, actually involves the application of an additional 15 pounds per square inch pressure which will effect a compression ratio of 30 to 1. Vapor from the volatile component will recondense upon application of the final pressure. It is thus possible to employ only a total of 2 atmospheres molding pressure in order to obtain a greater compression ratio than was employed in the prior art using as much as 200 pounds per square inch molding pressure. It will, of course, be appreciated that greater molding pressures can be used in the practice of the instant invention and such greater molding pressures will necessarily result in still greater compression ratios. The advantages of the invention are thus two-fold in this respect in that much greater compression can be effected, if such is desired; and much lower operating pressures may be employed to obtain compression ratios equivalent to those of the prior art, thus avoiding wear and tear on the molding elements.

Referring now to the carriage mechanism indicated generally by the reference numeral 10c, which is shown in some detail in Figure 3, it will be noted that Figure 3 shows the right hand side of the mold assembly of Figure 1 in closed position. The bottom mold member 10b has a flat base portion 26 supporting the mold member 10b from beneath and the base portion 26 is suitably affixed to a fixed mounting block 27, which may be formed of concrete or some other conveniently sturdy material and which supports the lower mold form 10b maintaining the same in a generally horizontal plane. A linking post 28 is embedded in the mounting means 27 and extends outwardly from one wall thereof to engage detachably a linking arm 29. At the lower end of the linking arm 29 a suitably detachable means 30 is provided, in this case, in the form of a ring which slips over the linking post 28. Other detachable linking means may be used in place of the elements 28 and 30. The linking arms 29 are carried by a beam 31, being attached at their upper ends by suitable means such as the ring 32, and the arms 29 extend downwardly on either side of the mold 10. The beam 31 is made of suitable structural material such as wood or metal beams and it is adapted to ride on a platen 33 during its movement. During movement upwardly and downwardly of the beam 31, the linking arm 29 is, of course, detached so that the linking post 28 will not prevent movement of the beam 31. The upper mold form 10a is suitably equipped with looped hangers 34 which receive the downwardly extending cables 35 suitably attached to lifting means (not shown) which is a lightweight moving device such as an electric hoist. The cables 35 carry at their depending ends suitable engaging means for the hangers 34, such as rings 36. The cables 35 thus provide for movement of the mold form 10a with the lower platen 37, a resilient bag 38, the platen 33 and the beam 31. In ordinary movement of the form 10a, the total weight of the moving assembly is borne by the cables 35. However, when the mold form 10a is brought to rest upon the mat 14 covering the lining 11, the cables 35 no longer carry weight. The upper platen 33 is secured to the bottom of the beam 31 and the lower platen 37 is rigidly secured to the top of the mold form 10a. These platens 33 and 37 present substantially parallel horizontal faces (of substantially the area of the mat 14 in top plan view) which have positioned therebetween fluid pressure actuated means in the form of the diaphragm 38. The diaphragm 38 is suitably flexible (rubber) bag or diaphragm which is connected to a source of fluid under pressure (not shown).

In the operation of the instant device, after the mat 14 has been placed upon the lining 11, the mold form 10a is lowered until it comes to rest upon the mat 14. In so lowering the top mold form 10a, guide pins carried by the top mold form 10a and designated by the reference numeral 39 are caused to be inserted into guide apertures in the base of the lower mold form 10b. The guide aperture shown in Figure 3 is designated by the reference numeral 40, and these guide apertures 40 and guide pins 39 have very close tolerances, because the guide pins are employed to insure the very close spacing of the cutoff edges 15 and 16.

After the guide pins have been suitably inserted in the guide apertures 40, the assembly moves down to bring the mold form 10a to rest upon the mat 14, and the detachable linking arms 29 are put in position so as to form a secure link between the beam 31 and the linking posts 28, thereby preventing upward movement of the beam 31. After the vacuum has been drawn in the cavity and the application of pressure is required, then the source of fluid under pressure is opened into the diaphargm 38 and relatively low pressures of $\frac{1}{2}$ to 5 atmospheres may be employed in the diaphragm 38. The diaphragm 38 working against the firmly secured upper platen 33 urges the lower platen 37 and the mold form 10a affixed thereto downwardly to apply the desired pressure to the mat 14 in the cavity.

A number of unique advantages are obtained in the practice of the instant invention. For example, because of the lower operating pressures allowed by the instant invention (employing evacuating means) the extremely heavy conventional hydraulic press heretofore employed to obtain the high pressures of 200 pounds per square inch may now be dispensed with. A relatively light-weight electric hoist may effectively operate to move the assembly up and down. The lower total force applied against the mold form 10a might in some cases result in a certain amount of side thrust (because of irregularities in the thicknesses of the mat and resin), but the lower total force applied results in a relatively low side thrust, and the guide pins 39 embedded in the plastic bodies are sufficient to register one mold form in closing alignment with the other.

Because of the use of relatively light-weight mold forms 10a and 10b, plus the unique metal liner 11 as a heating means, the use of lower external forces applied to the mold is desirable; and such lower external forces can be applied with the inflatable bag or diaphragm 38 pressing against the rectangular platen 37 and against the upper platen 33 which is effectively secured to the supporting base 27 (by means of the linking arms 29). The detachable linking arms, of course, permit quick assembly and disassembly of the mold elements in closed position. Moreover, the upper mold form 10a, and platens 33 and 37 and the linking arm assemblies are all relatively light, and they may be hoisted up and down by a simple economical electrical hoist. Also, such electrical hoist is particularly effective in hoisting the movable members to a sufficient height to provide ample room for applying the glas fiber mat 14 to the lining 11 and removing the resulting laminate therefrom. Access to the lining 11 is thus greatly facilitated by this inexpensive expedient and also the various other paraphernalia ordinarily associated with the hydraulic press, such as the four posts which carry the upper platen, are not required in the instant device.

It will be understood that modifications and variations may be effected without departing from the scope of the novel concepts of the present invention.

I claim as my invention:

Molding apparatus comprising a plurality of mold members cooperating to define a die cavity, a rigid metal cavity lining carried by one of said mold members, electrical contacts for causing a current flow across said lining, said mold members being formed of lightweight electric insulator materials, means for selectively moving said members in and out of cavity forming relationship, means for separably locking said members together, and fluid pressure actuated means carried by said moving means for applying pressure against said mold members to exert pressure against a molding composition in the cavity.

References Cited in the file of this patent
UNITED STATES PATENTS

| | | |
|---|---|---|
| 1,929,535 | Parker | Oct. 10, 1933 |
| 2,183,857 | Turkington | Dec. 19, 1939 |
| 2,234,839 | Edwards | Mar. 11, 1941 |
| 2,370,322 | Nebesar | Feb. 27, 1945 |
| 2,411,043 | Klassen | Nov. 12, 1946 |
| 2,458,864 | Lindsay | Jan. 11, 1949 |
| 2,478,165 | Collins | Aug. 2, 1949 |
| 2,615,201 | Cloud | Oct. 28, 1952 |
| 2,772,012 | Crabtree | Nov. 27, 1956 |